United States Patent [19]

Moore

[11] 4,344,547

[45] Aug. 17, 1982

[54] INTEGRAL HEATER FOLLOWER PLATE

[76] Inventor: Leo M. Moore, Box 103, Rte., 4, Ashland, Va. 23005

[21] Appl. No.: 125,119

[22] Filed: Feb. 27, 1980

[51] Int. Cl.³ .............................................. B67D 5/62
[52] U.S. Cl. ............................................ 222/146 HE
[58] Field of Search ........ 222/146 R, 146 H, 146 HE, 222/260, 261, 262; 219/230, 421

[56] References Cited

U.S. PATENT DOCUMENTS

| | | | |
|---|---|---|---|
| 3,031,106 | 4/1962 | Hooker | 222/146 H |
| 3,758,003 | 9/1973 | Kautz et al. | 222/146 HE |
| 3,982,669 | 9/1976 | Moore | 222/146 HE |
| 4,195,755 | 4/1980 | Slautterback et al. | 222/146 HE |
| 4,227,069 | 10/1980 | Gardner et al. | 222/146 HE |

*Primary Examiner*—David A. Scherbel
*Attorney, Agent, or Firm*—Witherspoon & Hargest

[57] ABSTRACT

An integrally fabricated heater follower plate primarily for use with hot melt dispensing apparatus is disclosed. The heater follower plate is fabricated from a solid circular disk of heat conducting material. The disk is machined to form a plurality of fins across the bottom face of the disk. A hole is cut through the center of the disk and a plurality of holes are cut into the top face of the disk. A separate cartridge-type heating element is placed into each one of the holes cut into the top face of the disk.

6 Claims, 4 Drawing Figures

INTEGRAL HEATER FOLLOWER PLATE

BACKGROUND OF THE INVENTION

This invention relates to a heater follower apparatus for hot melt dispensers and more particularly to an integrally fabricated heater follower plate for hot melt dispensers.

In recent years, various different materials that are now commonly called hot melt materials have been developed. Hot materials are generally either unpumpable solids or high viscosity unpumpable liquids at or below a given temperature. There are many different types of hot metal materials and these various different hot melt materials require different temperatures to convert them from a solid to a pumpable liquid to from a highly viscous unpumpable liquid to a less viscous pumpable liquid.

While hot melt materials have numerous potential uses, these materials have not been used as widely as anticipated by persons knowledgeable in the field, because of problems encountered in dispensing the materials at a suitable rate, particularly the high viscosity hot melt materials. While smaller containers have been used, producers of hot melt materials generally store and transport the hot melt materials to the consumer in 55 gallons drums. Several different types of dispensers for heating and dispensing hot melt materials from their containers have been developed. One type of dispenser available on the market utilizes a follower plate in combination with a heater. The follower plate and the heater are lowered into the container of hot melt material and the heater is then energized to melt the hot melt material. As the hot metal material is melted, it is dispensed from its container, generally by means of a pump that pumps the material out of the container through an opening provided in the follower plate. As the material is dispensed out of the container, the heater and follower plate move down into the container. Such hot metal dispensers using a separate heater and follower plate are disclosed, for example, in U.S. Pat. No. 3,282,469 to Skonberg and U.S. Pat. No. 3,637,111 to McCreary. In the said Skonberg patent the heater is secured to the bottom of the follower plate and an insulator is placed between the follwer plate and the heater. In the McCreary patent. the heater is located below and spaced apart from the follower plate. There are, of course, other hot melt dispensers on the market.

I first became involved with hot melt materials and dispensers when I was working on a project relating to insulated widow panes. The material being used was a highly viscous hot melt material. I was unable to obtain a dispensing rate suitable for my purposes with the prior art dispenser that I was using.

It became readily apparent, that in order to dispense the hot melt material at a rate suitable for my purposes, I had to have dispensing apparatus that melted the hot melt material at a suitable rate without scorching or burning the material. After considerable effort, I developed an integrally fabricated heater follower plate that upon testing, melted the material at a suitable rate for my purposes. That is, my heater follower plate melted the material at such a rate that is could be dispensed at the required rate. This heater follower plate is disclosed in my U.S. Pat. No. 3,982,669. The apparatus disclosed in my said U.S. Pat. No. 3,982,669 provided a melt rate and dispensing rate that was appreciably greater than I had been able to obtain previously.

Since my initial work with hot melt materials, I have conducted dispensing tests with a variety of different hot melt materials usually at the request of manufacturers of the hot melt materials. While conducting those tests, I continued to experiment with ways to increase the dispensing rate and with ways to more economically produce my integral heater follower plate. The integral heater follower plate of this invention is a product of that testing and experimentation.

With the integral heater follower plate of this invention, the melt rate, and therefore the dispensing rate, has been appreciably increased over the melt rate I obtained with the integral heater follower plate disclosed in my said U.S. Pat. No. 3,982,669.

SUMMARY OF THE INVENTION

This invention relates to an integrally fabricated heater follower plate for hot melt dispensers that provides a relatively high melt rate. The heater follower plate of this invention is fabricated from a piece of heat conducting material that is shaped to fit inside the hot melt container. Fins are machined out of the bottom surface of the piece of heat conducting material and a plurality of holes are cut into the top surface of the piece of heat conducting materials. Cartridge-type heating elements are inserted into the holes cut into the top surface. In addition, a hole is cut through the piece of heat conducting material. Before the fins are machined, a plurality of flow tunnels are drilled into the piece of heat conducting material. If wipers are provided, grooves are cut into the outer edge surface of the piece of heat conducting material to accomodate the wipers.

BRIEF DESCRIPTION OF THE DRAWING

A full and complete understanding of the invention can be obtained from the following detailed description of the invention when read in conjunction with the annexed drawing in which.

DETAILED DESCRIPTION OF THE INVENTION

Figure 1:
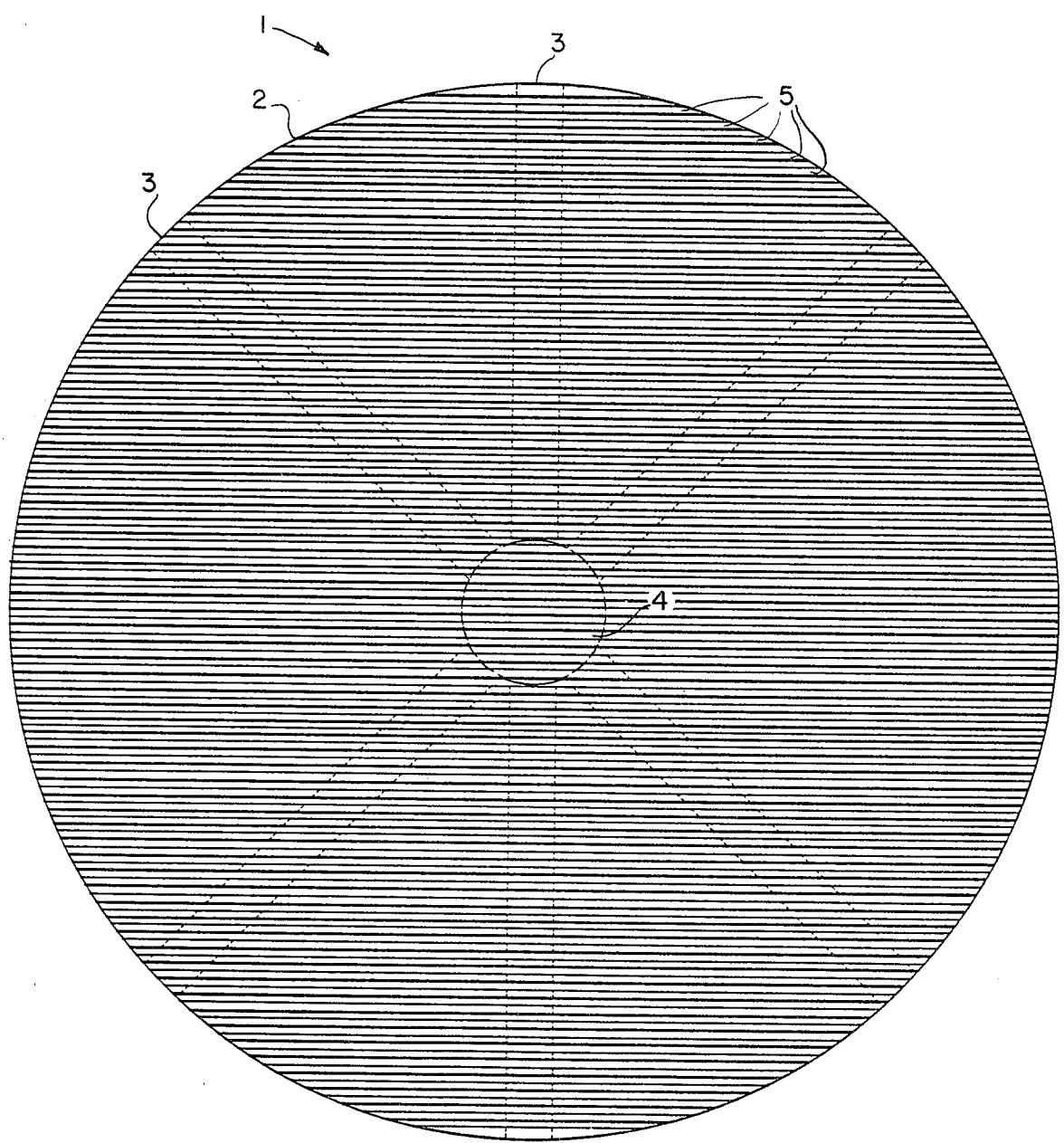
FIG. 1 is a bottom view of a preferred embodiment of the heater follower plate of this invention.

Since hot melt materials are commonly stored in large drums, the integrally fabricated heater follower plate 1 of this invention is shown in the drawing as being a circular disk 2, made from a heat conducting material, preferably aluminum. The diameter of disk 2 is such that disk 2 will fit snugly into the hot melt container. While the precise thickness of disk 2 is not critical, disk 2 is preferably not less than 4 inches and not more than 6 inches thick. In practice, disk 2 is approximately 5 inches thick. If the heater follower plate of this invention is to be used to dispense hot melt material out of a container other than the conventional drum, disk 2 will be shaped to fit that container. For example, if the hot metal material is stored in a square container, disk 2 would be square. However, disk 2 will generally be a circular disk since a vast majority of today's hot melt materials are stored in 55 gallon drums and dispensing directly from these large drums is generally the preferable method of dispensing these materials. Therefore, disk 2 will hereinafter be referred to as a circular disk.

Figure 2:
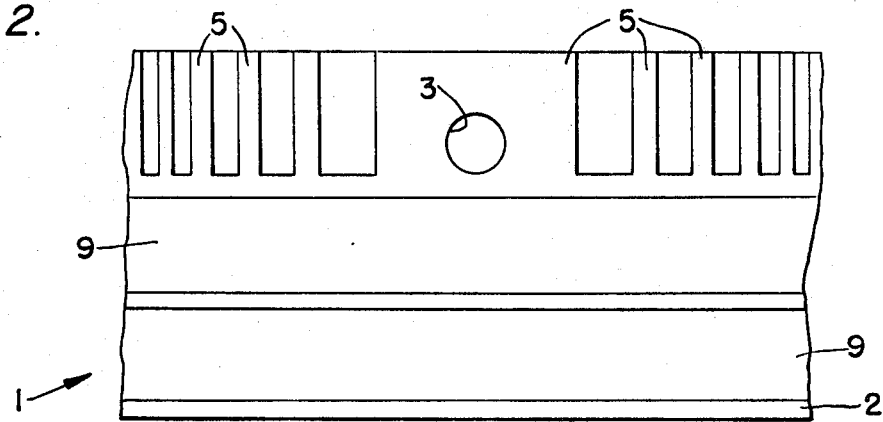
FIG. 2 is a partial edge view taken perpendicular to the direction of the fins of FIG. 1.
Figure 3:
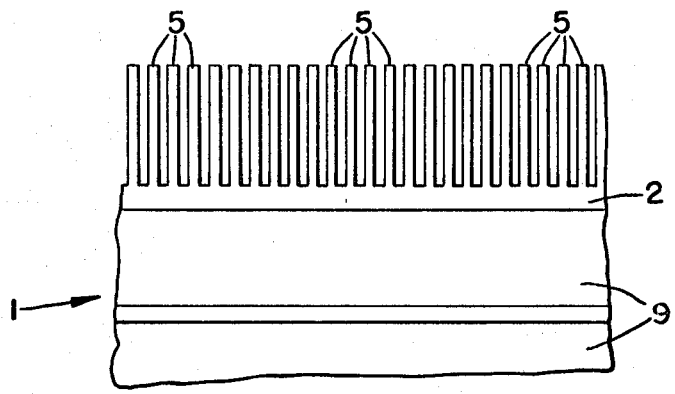
FIG. 3 is a partial edge view taken along the direction of the fins of FIG. 1.

Disk 2 is initially a circular disk that is flat on its top and bottom surfaces and has a generally smooth edge surface. A plurality of holes 3 are drilled from the edge of disk 2 into the center of disk 2 as shown in FIGS. 1 and 2. Generally, six holes 3 spaced as shown in FIG. 1, provided; however, six is not a critical number. The holes 3 are drilled a given distance above the bottom surface of disk 2 as is shown in FIG. 2.

After holes 3 have been drilled into disk 2, the bottom surface of disk 2 is machined to form a plurality of fins 5. The fins which are conveniently cut parallel to each other are generally straight, equally spaced, of the same thickness and are cut across the entire bottom surface of disk 2. While fins 5 do not have to be paralled, equally spaced, or of equal thickness, it is convenient from a machining standpoint, and therefore, also from a cost standpoint, to so configure the plurality of fins 5. Further, while the exact thickness of each of the fins 5 is not critical, fins 5 must be of such a thickness that they will not readily bend. However, when machined directly out of the bottom surface of the aluminum disk, even relatively thin fins are very strong.

Figure 4:
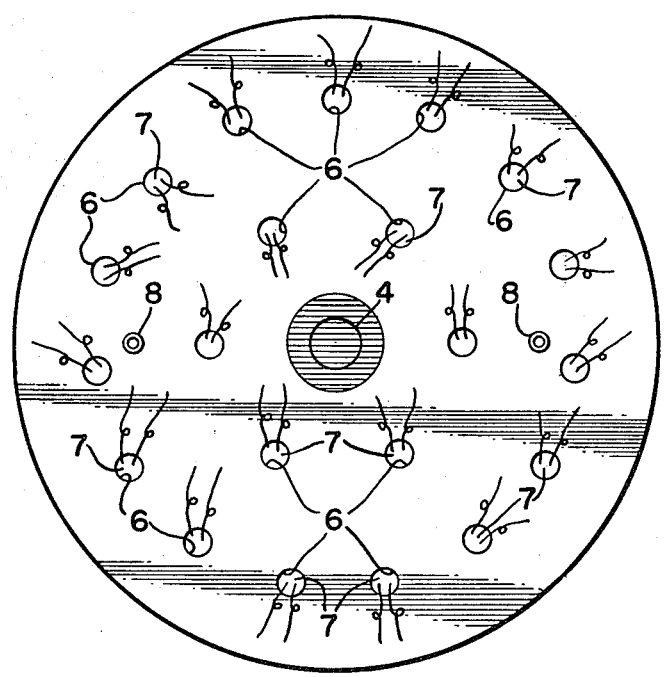
FIG. 4 is a top view of the preferred embodiment of the heater follower plate of the invention.

After fins 5 have been machined out of the bottom surface of disk 2, a hole 4 is drilled into the top surface down into the fins 5 to communicate with the spaces between fins 5 and with holes 3 as shown in FIGS. 1 and 4. The hole 4 is generally located in the center of disk 2.

In additin to hole 4, a plurality of the holes 6 are cut into the top surface of disk 2 as shown in FIG. 4. The holes 6 are preferably uniformly spaced across the top surface of disk 2, as shown. The holes 6 are not drilled as deeply as hole 4. That is, the holes 6 are not drilled down to the fins as is hole 4. A separate cartridge-type heating element 7 is dropped into each one of the holes 6. Each cartridge-type heating element 7 is merely pushed down into its respective hole 6 and not secured so that a burnt out or malfunctioning cartridge-type heating element 7 can readily be replaced.

In summary, the integrally fabricated heater follower plate of this invention comprises a disk 2 made of a heat conductive material, preferably aluminum, a plurality of fins 5 machined out of the bottom surface of disk 2, a hole 4 drilled into the top surface of disk 2 down to the fins 5, a plurality of cartridge-type heating elements 7 each housed in a separate hole 6 drilled into the top surface of disk 2 and a plurality of holes 3 drilled from the outer edge of disk 2 into hole 4. Further, while the various steps of fabricating the integral heater follower plate of this invention have been described above in a given sequence, the heater follower plate 1 does not have to be fabricated in the sequence given. A machinist will know the optimum sequence of the steps necessary to fabricate heater follower plate 1. For example, holes 3 are preferably drilled into disk 2 before the fins 5 are machined into the bottom surface of disk 2.

Integral heater follower plate 1 is designed for use with dispensers of the type disclosed in my said U.S. Pat. No. 3,982,669. That is, integral heater follower plate 1 is intended for use with dispensing apparatus having a double post hydraulic ram for raising and lowering the heater follower plate out of and into a container of hot melt material. Therefore, my said U.S. Pat. No. 3,982,669 is incorporated herein by reference.

Heater follower plate 1 of this invention can be directly substituted for the integral heater follower plate disclosed in my said U.S. Pat. No. 3,982,669. The support rods that secure the heater follower plate to the cross arm of the hydraulic ram shown in my said U.S. Pat. No. 3,982,669, would be threaded into the holes 8 shown in FIG. 1.

The dispensing apparatus disclosed in my said U.S. Pat. No. 3,982,669 utilizes two pumps. Integral heater follower plate 1 can be used with a single dump dispenser as well and can in fact be utilized in generally any hot melt dispensing apparatus that utilizes a heater that is lowered into the hot melt material with the material being pumped out of the container through the hole 4.

As has been previously mentioned, integral heater follower plate 1 is an improvement over my integral heater follower plate described and claimed in my said U.S. Pat. No. 3,982,669. The integral heater follower plate disclosed in my said U.S. Pat. No. 3,982,669 includes cartridge-type heating elements dropped in holes provided in the top surface, has a hole equivalent to hole 4 and preferably has a plurality of radial fins. The fins in my prior integral heater follower plate are secured to the bottom surface of the aluminum disk by screws or the like and in a later developed embodiments are wedged into slots cut into the bottom surface of the disk. While the wedged fins are in good heat contact with the disk, the fins 5 of this invention are a part of the disk 2 and therefore better heat transfer is provided. In addition, the fins of my heater follower plate disclosed in my said U.S. Pat. No. 3,982,669, are radially disposed along the bottom surface of the disk and therefore the spacing between the fins becomes progressively smaller going from the outer surface of the disk to the hole equivalent to hole 4. In fact, the space between the fins is quite narrow at the center of the disk. In this invention, the space between the fins 5 is uniform across the entire bottom surface of the disk. By actual comparison with the same hot melt material and same overall dispensing apparatus, integral heater follower plate 1 provided a melt rate approximately double the melt rate provided with the integral heater follower plate disclosed in my said U.S. Pat. No. 3,982,669.

As stated, integral heater follower plate 1 is lowered into a drum from which hot melt material is to be dispensed. After integral heater follower plate 1 is lowered into the container, the cartridge-type heating elements are energized and after an appropriate warm up period, which is relatively short, the hot melt material is ready for dispensing. The molten hot melt material is pumped out of the container through hole 4. The molten material flows into hole 4 from the spaces between those fins 6 that cross over hole 4 and into hole 4 through the holes 3. Several dispensers using integral heater follower plate 1 have been built and tested. The rate at which the hot melt material could be dispensed was greater than anticipated. From several years of experience with hot melt dispensers, it became apparent to me that any increase in the rate at which hot material could be dispensed depended primarily on the rate at which the hot melt material could be melted. Dispensers equipped with heater follower plate 1 have provided dispensing rates that far exceed the normal rate available with the prior art dispensers known to me.

The integral heater follower plate disclosed in my said U.S. Pat. No. 3,982,669 is provided with a pair of wipers. Heater follower plate 1 of this invention is also provided with wipers for some applications. If wipers are to be provided, the pair of grooves or channels 9, shown in FIG. 2 will be provided. A separate wiper is secured in each of the channels 9 as disclosed in my said U.S. Pat. No. 3,982,669. If wipers are not provided, the grooves 9 are not necessary, and the outer edge of disk 2 can be a smooth surface.

While the invention has been described and illustrated with reference to a specific preferred embodiment, it will be apparent to those skilled in the art that various changes and modifications can be made to this preferred embodiment without departing from the spirit and scope of the invention as set forth in the claims.

What is claimed is:

1. An integrally fabricated heater follower plate for use with hot melt dispensing apparatus, comprising:

a biscuit of heat conducting material shaped to fit inside a container of hot melt material;

a plurality of fins machined out of the bottom surface of said biscuit of heat conducting material;

a single vertical hole cut from the top surface of said biscuit of heat conducting material down toward said bottom surface into communication with the spaces between said plurality of fins;

heating means in intimate heat contact relationship with said biscuit of heat conducting material; and, a plurality of spaced apart horizontal holes cut from the edge surface of said biscuit through said fins into communication with said single vertical hole.

2. An integral heater follower plate as defined in claim 1 wherein a plurality of vertical holes, substantially equally spaced across said top surface, are cut into said top surface toward said bottom surface and wherein said heating means comprises a plurality of cartridge-type heating elements, a separate one of said plurality of cartridge-type heating elements being housed in each one of said plurality of vertical holes.

3. An integral heater follower plate as defined in claim 2 wherein said single vertical hole is located at approximately the center of said biscuit of heat conducting material.

4. An integral heater follower plate as defined in claim 3 wherein said biscuit of heat conducting material is a circular disk of heat conducting material.

5. An integral heater follower plate as defined in claim 4 wherein said circular disk of heat conducting material is approximately five inches in thickness.

6. An integral heater follower plate as defined in claim 1 wherein each of said fins is substantially straight and of uniform thickness, is equally spaced from adjacent of said fins and extend across the entire bottom surface of said biscuit.

* * * * *